US 11,025,922 B2

(12) United States Patent
Budagavi

(10) Patent No.: US 11,025,922 B2
(45) Date of Patent: Jun. 1, 2021

(54) INVERSE TRANSFORMATION USING PRUNING FOR VIDEO CODING

(71) Applicant: Texas Instruments Incorporated, Dallas, TX (US)

(72) Inventor: Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/917,540

(22) Filed: Jun. 13, 2013

(65) Prior Publication Data

US 2013/0336385 A1   Dec. 19, 2013

Related U.S. Application Data

(60) Provisional application No. 61/659,055, filed on Jun. 13, 2012.

(51) Int. Cl.
| | | |
|---|---|---|
| *H04N 7/12* | (2006.01) | |
| *H04N 11/02* | (2006.01) | |
| *H04N 19/176* | (2014.01) | |
| *H04N 19/127* | (2014.01) | |
| *H04N 19/156* | (2014.01) | |
| *H04N 19/625* | (2014.01) | |

(52) U.S. Cl.
CPC ......... *H04N 19/176* (2014.11); *H04N 19/127* (2014.11); *H04N 19/156* (2014.11); *H04N 19/625* (2014.11)

(58) Field of Classification Search
CPC .. H04N 19/127; H04N 19/176; H04N 19/156; H04N 19/625

USPC ........................................................ 375/240.2
See application file for complete search history.

(56) References Cited

U.S. PATENT DOCUMENTS

| 7,366,236 | B1 | 4/2008 | Winger | |
|---|---|---|---|---|
| 2002/0122601 | A1 | 9/2002 | Peng | |
| 2008/0232475 | A1* | 9/2008 | Handley et al. | 375/240.18 |
| 2012/0140813 | A1* | 6/2012 | Sole Rojals et al. | 375/240.02 |
| 2012/0287989 | A1* | 11/2012 | Budagavi | H04N 19/46 375/240.03 |

(Continued)

OTHER PUBLICATIONS

Madhukar Budagavi, "IDCT Pruning", JCTVC-E386, Joint Collaborative Team on Video Coding (JCT-VC) of ITU-T SG16 WP3 and ISO/IEC JTC1/SC29/WG11, pp. 1-6, Mar. 16-23, 2011, Geneva, Switzerland.

(Continued)

*Primary Examiner* — Zhihan Zhou
(74) *Attorney, Agent, or Firm* — Charles F. Koch; Charles A. Brill; Frank D. Cimino

(57) ABSTRACT

A method for inverse discrete cosine transformation (IDCT) in video coding is provided that includes receiving a transform block, identifying a region of non-zero transform coefficients in the transform block using a group significance map corresponding to the transform block, wherein any transform coefficients not in the region have a value of zero, applying a one-dimensional (1D) IDCT to the region of non-zero transform coefficients in a first direction to generate an interim results block, wherein 1D IDCT computations are not performed on transform coefficients outside the region, and applying a 1D IDCT to the interim results block in a second direction to generate a residual block.

2 Claims, 10 Drawing Sheets

| 0 1 0 0 | 0 0 0 0 | 0 0 0 0 | 0 0 0 0 |
|---|---|---|---|
| 1 0 0 0 | 0 0 0 0 | 0 0 0 0 | 0 0 0 0 |
| 0 1 0 0 | 0 0 0 0 | 0 0 0 0 | 0 0 0 0 |
| 0 0 0 1 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |

(56) References Cited

U.S. PATENT DOCUMENTS

2013/0188735 A1* 7/2013 Nguyen et al. .......... 375/240.25

OTHER PUBLICATIONS

Nguyen Nguyen et al, "Multi-level Significance Maps for Large Transform Units", JCTVC-G644, Joint Collaborative Team on Video Coding (JCT-VC) of ITU-T SG16 WP3 and ISO/IEC JTC1/SC29/WG11, pp. 1-14, Nov. 21-30, 2011, Geneva, Switzerland.
Nguyen Nguyen et al, "Multi-level Significance Maps for Large Transform Units", JCTVC-G644 presentation, Joint Collaborative Team on Video Coding (JCT-VC) of ITU-T SG16 WP3 and ISO/IEC JTC1/SC29/WG11, pp. 1-6, Nov. 21-30, 2011, Geneva, Switzerland.
Madhukar Budagavi and Vivienne Sze, "IDCT Pruning and Scan Dependent Transform Order", JCTVC-F236, Joint Collaborative Team on Video Coding (JCT-VC) of ITU-T SG16 WP3 and ISO/IEC JTC1/SC29/WG11, pp. 1-7, Jul. 14-22, 2011, Torino, Italy.

* cited by examiner

| 0 1 0 0 | 0 0 0 0 | 0 0 0 0 | 0 0 0 0 |
|---|---|---|---|
| 1 0 0 0 | 0 0 0 0 | 0 0 0 0 | 0 0 0 0 |
| 0 1 0 0 | 0 0 0 0 | 0 0 0 0 | 0 0 0 0 |
| 0 0 0 1 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |

FIG. 2B $$\begin{bmatrix} Y0 \\ Y1 \\ Y2 \\ Y3 \\ Y4 \\ Y5 \\ Y6 \\ Y7 \\ Y8 \\ Y9 \\ Y10 \\ Y11 \\ Y12 \\ Y13 \\ Y14 \\ Y15 \end{bmatrix} = \begin{bmatrix} C32, & C4, & C8, & C12, & C16, & C20, & \ldots & C56, & C60 \\ C32, & C12, & C24, & C36, & C48, & C60, & \ldots & -C40, & -C52 \\ C32, & C20, & C40, & C60, & -C48, & -C28, & \ldots & C24, & C44 \\ C32, & C28, & C56, & -C44, & -C16, & -C12, & \ldots & -C8, & -C36 \\ C32, & C36, & -C56, & -C20, & -C16, & -C52, & \ldots & C8, & C28 \\ C32, & C44, & -C40, & -C4, & -C48, & C36, & \ldots & -C24, & -C20 \\ C32, & C52, & -C24, & -C28, & C48, & C4, & \ldots & C40, & C12 \\ C32, & C60, & -C8, & -C52, & C16, & C44, & \ldots & -C56, & -C4 \\ C32, & -C60, & -C8, & C52, & C16, & -C44, & \ldots & -C56, & C4 \\ C32, & -C52, & -C24, & C28, & C48, & -C4, & \ldots & C40, & -C12 \\ C32, & -C44, & -C40, & C4, & -C48, & -C36, & \ldots & -C24, & C20 \\ C32, & -C36, & -C56, & C20, & -C16, & C52, & \ldots & C8, & -C28 \\ C32, & -C28, & C56, & C44, & -C16, & C12, & \ldots & -C8, & C36 \\ C32, & -C20, & C40, & -C60, & -C48, & C28, & \ldots & C24, & -C44 \\ C32, & -C12, & -C24, & -C36, & C48, & -C60, & \ldots & -C40, & C52 \\ C32, & -C4, & C8, & -C12, & C16, & -C20, & \ldots & C56, & -C60 \end{bmatrix} \begin{bmatrix} X0 \\ X1 \\ X2 \\ X3 \\ X4 \\ X5 \\ X6 \\ X7 \\ X8 \\ X9 \\ X10 \\ X11 \\ X12 \\ X13 \\ X14 \\ X15 \end{bmatrix}$$

FIG. 11

$$\begin{bmatrix} Y0 \\ Y1 \\ Y2 \\ Y3 \\ Y4 \\ Y5 \\ Y6 \\ Y7 \\ Y8 \\ Y9 \\ Y10 \\ Y11 \\ Y12 \\ Y13 \\ Y14 \\ Y15 \end{bmatrix} = \begin{bmatrix} C32, & C4, & C8, & C12 \\ C32, & C12, & C24, & C36 \\ C32, & C20, & C40, & C60 \\ C32, & C28, & C56, & -C44 \\ C32, & C36, & -C56, & -C20 \\ C32, & C44, & -C40, & -C4 \\ C32, & C52, & -C24, & -C28 \\ C32, & C60, & -C8, & -C52 \\ C32, & -C60, & -C8, & C52 \\ C32, & -C52, & -C24, & C28 \\ C32, & -C44, & -C40, & C4 \\ C32, & -C36, & -C56, & C20 \\ C32, & -C28, & C56, & C44 \\ C32, & -C20, & C40, & -C60 \\ C32, & -C12, & C24, & -C36 \\ C32, & -C4, & C8, & -C12 \end{bmatrix} \begin{bmatrix} X0 \\ X1 \\ X2 \\ X3 \end{bmatrix}$$

FIG. 12

EVEN PART $$\begin{bmatrix} Z0 \\ Z1 \\ Z2 \\ Z3 \\ Z4 \\ Z5 \\ Z6 \\ Z7 \end{bmatrix} = \begin{bmatrix} C32, & C8, & C16, & C24, & C32, & C40, & C48, & C56 \\ C32, & C24, & C48, & -C56, & -C32, & -C8, & -C16, & -C40 \\ C32, & C40, & -C48, & -C8, & -C32, & C56, & C16, & C24 \\ C32, & C56, & -C16, & -C40, & C32, & C24, & -C48, & -C8 \\ C32, & -C56, & -C16, & C40, & C32, & -C24, & -C48, & C8 \\ C32, & -C40, & -C48, & C8, & -C32, & -C56, & C16, & -C24 \\ C32, & -C24, & C48, & C56, & -C32, & C8, & -C16, & C40 \\ C32, & -C8, & C16, & -C24, & C32, & -C40, & C48, & -C56 \end{bmatrix} \begin{bmatrix} X0 \\ X2 \\ X4 \\ X6 \\ X8 \\ X10 \\ X12 \\ X14 \end{bmatrix}$$

ODD PART $$\begin{bmatrix} Z8 \\ Z9 \\ Z10 \\ Z11 \\ Z12 \\ Z13 \\ Z14 \\ Z15 \end{bmatrix} = \begin{bmatrix} -C60, & C52, & -C44, & C36, & -C28, & C20, & -C12, & C4 \\ -C52, & C28, & -C4, & C20, & -C44, & -C60, & C36, & -C12 \\ -C44, & C4, & -C36, & -C52, & C12, & -C28, & -C60, & C20 \\ -C36, & C20, & C52, & -C4, & C60, & C12, & -C44, & -C28 \\ -C28, & C44, & C12, & -C60, & -C4, & -C52, & C20, & C36 \\ -C20, & -C60, & C28, & C12, & C52, & -C36, & -C4, & -C44 \\ -C12, & -C36, & -C60, & C44, & C20, & C4, & C28, & C52 \\ -C4, & -C12, & -C20, & -C28, & -C36, & -C44, & -C52, & -C60 \end{bmatrix} \begin{bmatrix} X1 \\ X3 \\ X5 \\ X7 \\ X9 \\ X11 \\ X13 \\ X15 \end{bmatrix}$$

ADD-SUB $$\begin{bmatrix} Y0 \\ Y1 \\ Y2 \\ Y3 \\ Y4 \\ Y5 \\ Y6 \\ Y7 \\ Y8 \\ Y9 \\ Y10 \\ Y11 \\ Y12 \\ Y13 \\ Y14 \\ Y15 \end{bmatrix} = \begin{bmatrix} Z0-Z15 \\ Z1-Z14 \\ Z2-Z13 \\ Z3-Z12 \\ Z4-Z11 \\ Z5-Z10 \\ Z6-Z9 \\ Z7-Z8 \\ Z7+Z8 \\ Z6+Z9 \\ Z5+Z10 \\ Z4+Z11 \\ Z3+Z12 \\ Z2+Z13 \\ Z1+Z14 \\ Z0+Z15 \end{bmatrix}$$

FIG. 13

EVEN PART $$\begin{bmatrix} Z0 \\ Z1 \\ Z2 \\ Z3 \\ Z4 \\ Z5 \\ Z6 \\ Z7 \end{bmatrix} = \begin{bmatrix} C32, & C8 \\ C32, & C24 \\ C32, & C40 \\ C32, & C56 \\ C32, & -C56 \\ C32, & -C40 \\ C32, & -C24 \\ C32, & -C8 \end{bmatrix} \begin{bmatrix} X0 \\ X2 \end{bmatrix}$$

ODD PART $$\begin{bmatrix} Z8 \\ Z9 \\ Z10 \\ Z11 \\ Z12 \\ Z13 \\ Z14 \\ Z15 \end{bmatrix} = \begin{bmatrix} -C60, & C52 \\ -C52, & C28 \\ -C44, & C4 \\ -C36, & C20 \\ -C28, & C44 \\ -C20, & -C60 \\ -C12, & -C36 \\ -C4, & -C12 \end{bmatrix} \begin{bmatrix} X1 \\ X3 \end{bmatrix}$$

ADD-SUB $$\begin{bmatrix} Y0 \\ Y1 \\ Y2 \\ Y3 \\ Y4 \\ Y5 \\ Y6 \\ Y7 \\ Y8 \\ Y9 \\ Y10 \\ Y11 \\ Y12 \\ Y13 \\ Y14 \\ Y15 \end{bmatrix} = \begin{bmatrix} Z0-Z15 \\ Z1-Z14 \\ Z2-Z13 \\ Z3-Z12 \\ Z4-Z11 \\ Z5-Z10 \\ Z6-Z9 \\ Z7-Z8 \\ Z7+Z8 \\ Z6+Z9 \\ Z5+Z10 \\ Z4+Z11 \\ Z3+Z12 \\ Z2+Z13 \\ Z1+Z14 \\ Z0+Z15 \end{bmatrix}$$

FIG. 14

INVERSE TRANSFORMATION USING PRUNING FOR VIDEO CODING

CROSS-REFERENCE TO RELATED APPLICATIONS

This application claims benefit of U.S. Provisional Patent Application Ser. No. 61/659,055, filed Jun. 13, 2012, which is incorporated herein by reference in its entirety. This application may be related to co-pending United States Patent Application Publication No. 2012/0287989, filed May 13, 2012, which is incorporated herein by reference in its entirety.

BACKGROUND OF THE INVENTION

Field of the Invention

Embodiments of the present invention generally relate to inverse transformation using pruning in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

Two dimensional (2D) block transforms, e.g., 2D discrete cosine transforms (DCT), and variants are used in video coding to reduce spatial redundancy and achieve compression. Accordingly, 2D inverse transforms, e.g., 2D inverse DCT (IDCT) are performed in video decoding as part of decompressing encoded video. A 2D IDCT is a separable transform that may be split into row and column one-dimensional (1D) IDCTs for application. The video coding standard in use typically defines the order in which the row and column IDCTs are applied so that an encoded video bit stream is decoded identically in all compliant decoders. For example, in the H.264/AVC video coding standard, the row inverse transform is applied first followed by the column inverse transform.

The high frequency region in transform blocks is typically zero due to quantization and the energy compaction properties of the transform. The knowledge that a large portion of a transform block may be zero is exploited for IDCT pruning, also referred to as partial inverse transformation, to reduce the computational complexity of an IDCT. In IDCT pruning, many 2D IDCT computations that have zero input and zero output, i.e., computations corresponding to a region having only zero values, may be eliminated to reduce computational complexity. IDCT pruning is a well known technique that is supported by existing video coding standards that use a zigzag scan pattern to scan coefficients in a transform block.

SUMMARY

Embodiments of the present invention relate to methods and apparatus for inverse transformation using pruning in video coding. In one aspect, a method for inverse discrete cosine transformation (IDCT) in video coding is provided that includes receiving a transform block, identifying a region of non-zero transform coefficients in the transform block using a group significance map corresponding to the transform block, wherein any transform coefficients not in the region have a value of zero, applying a one-dimensional (1D) IDCT to the region of non-zero transform coefficients in a first direction to generate an interim results block, wherein 1D IDCT computations are not performed on transform coefficients outside the region, and applying a 1D IDCT to the interim results block in a second direction to generate a residual block, wherein the first direction and the second direction are opposite directions selected from a group consisting of a vertical direction and a horizontal direction.

In one aspect, an apparatus configured to perform inverse discrete cosine transformation (IDCT) in video coding is provided that includes means for receiving a transform block, means for identifying a region of non-zero transform coefficients in the transform block using a group significance map corresponding to the transform block, wherein any transform coefficients not in the region have a value of zero, means for applying a one-dimensional (1D) IDCT to the region of non-zero transform coefficients in a first direction to generate an interim results block, wherein 1D IDCT computations are not performed on transform coefficients outside the region, and means for applying a 1D IDCT to the interim results block in a second direction to generate a residual block, wherein the first direction and the second direction are opposite directions selected from a group consisting of a vertical direction and a horizontal direction.

In one aspect, a non-transitory computer readable medium storing software instructions is provided. The software instructions, when executed by a processor, cause a method for inverse discrete cosine transformation (IDCT) in video coding to be performed, the method including receiving a transform block, identifying a region of non-zero transform coefficients in the transform block using a group significance map corresponding to the transform block, wherein any transform coefficients not in the region have a value of zero, applying a one-dimensional (1D) IDCT to the region of non-zero transform coefficients in a first direction to generate an interim results block, wherein 1D IDCT computations are not performed on transform coefficients outside the region, and applying a 1D IDCT to the interim results block in a second direction to generate a residual block, wherein the first direction and the second direction are opposite directions selected from a group consisting of a vertical direction and a horizontal direction.

BRIEF DESCRIPTION OF THE DRAWINGS

Particular embodiments will now be described, by way of example only, and with reference to the accompanying drawings:

FIGS. 2A and 2B are examples of a significance map and a corresponding group significance map;

FIGS. 7 and 9-14 are examples; and

DETAILED DESCRIPTION OF EMBODIMENTS OF THE INVENTION

Figure 1:
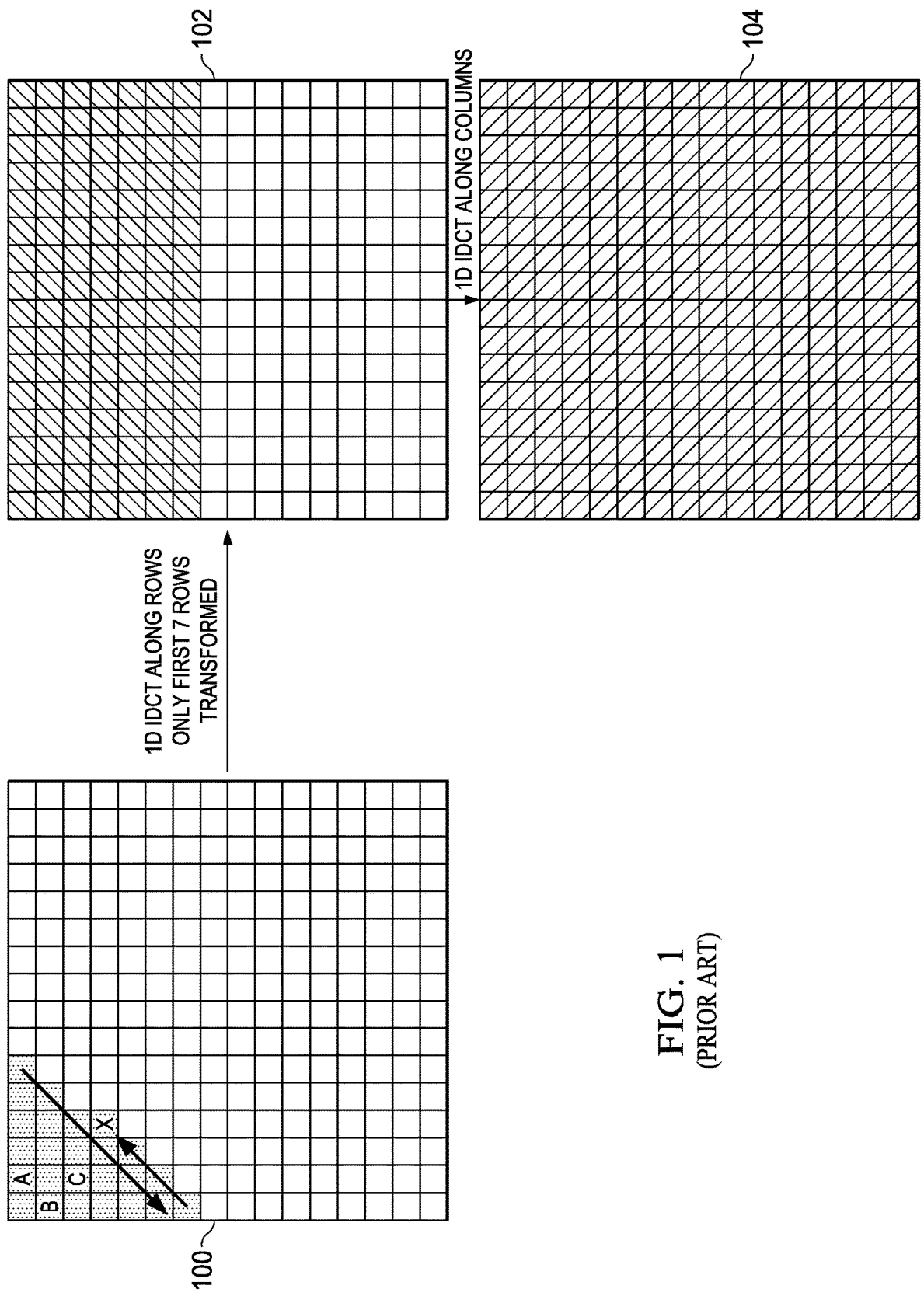
FIG. 1 is an example of prior art IDCT pruning for a zigzag scan pattern.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. For convenience of description, embodiments of the invention are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, 32×32, 4×16, 16×4, 8×32, and 32×8. The sizes of the transforms units and prediction units for a CU are determined by the video encoder during prediction based on minimization of rate/distortion costs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003_dK, Joint Collaborative Team on Video Coding (JCT-VC) of ITU-T SG16 WP3 and ISO/IEC JTC1/SC29/WG1, San Jose, Calif., Feb. 1-10, 2012, ("HEVC Draft 6"), B. Bross, et al., "High Efficiency Video Coding (HEVC) Text Specification Draft 7," JCTVC-11003_d9, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), B. Bross, et al., "High Efficiency Video Coding (HEVC) Text Specification Draft 9," JCTVC-K1003_v13, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9"), and B. Bross, et al., "High Efficiency Video Coding (HEVC) Text Specification Draft 10 (for FDIS & Last Call)," JCTVC-L1003_v34, Joint Collaborative Team on Video Coding (JCT-VC) of ITU-T SG16 WP3 and ISO/IEC JTC1/SC29/WG1, Geneva, CH, Jan. 14-23, 2013 ("HEVC Draft 10").

As previously discussed, inverse transformation with pruning is a well-known technique supported by existing video coding standards such as H.264/AVC. These video coding standards primarily use a zigzag scan pattern to scan coefficients in a transform block and the largest transform size used is 8×8. Further, the 2D IDCT needed to inversely transform a block of transform coefficients may be split into row (horizontal) and column (vertical) one-dimensional (1D) IDCTs for application. The video coding standard in use typically defines the order in which the row and column IDCTs are applied in the decoder. For row-column order, a 1D IDCT is performed horizontally on the rows of the transform block, and a 1D IDCT is performed is then performed vertically on the columns of the resulting block. For column-row order, a 1D IDCT is performed vertically on the columns of the transform block, and a 1D IDCT is performed is then performed horizontally on the rows of the resulting block.

In general, to perform IDCT pruning when a zigzag scan pattern is used, the decoder determines the position of the last non-zero coefficient in a transform block. A non-zero coefficient may also be referred to as a significant coefficient herein. This position may be communicated to the decoder in the encoded bit stream being decoded. Given the position on the last non-zero coefficient, the decoder can determine how many rows (or columns) of the transform block may have at least one non-zero coefficient. For example, assuming a square transform block, for most possible positions of the last non-zero coefficient, the sum of the coordinates (x,y) of the position relative to the upper left corner (0,0) of the transform block added to 1 is the number of rows (or columns) L that may have at least one non-zero coefficient, i.e., x+y+1=L.

Because the remaining rows (columns) contain only zeroes, there is no need to perform the first 1D IDCT on those rows (columns) as the computation results for those rows (columns) will be zero. Accordingly, for row-column order, the computations of the 1D IDCT are performed only on the first L rows of the transform block and the remaining rows of the resulting block are assumed to be zero. Similarly, for column-row order, the computations of the 1D IDCT are performed only on the first L columns of the transform block and the remaining columns of the resulting block are assumed to be zero.

FIG. 1 shows an example of IDCT pruning when a zigzag scan pattern is used for a transform block and row-column order for the IDCT is used. The non-shaded regions of each block indicate the region of the block containing only zero coefficients. In this example, the input transform block 100 is a 16×16 block. The position of the last non-zero coefficient in the block, indicated by the X, is (3,3), assuming the top left coordinate is (0,0). Thus, the number of rows that may have at least one non-zero coefficient is x+y+1=3+3+1=7. The last 9 rows are all zero. The first seven rows of the transform block 100 are transformed using the 1D IDCT to generate the first seven rows of the interim results block 102 as only the first 7 rows of the transform block 100 may have non-zero values. The remaining rows in the interim results block 102 are assumed to be 0. Then, all of the columns of the interim results block 102 are transformed using the 1D IDCT to generate the final inversely transformed output block 104.

HEVC includes large size 2D transforms, e.g., 16×16 and 32×32, to achieve improved compression performance. The large transforms have high computational complexity so techniques such as pruning are needed to reduce this computational complexity. Basing the amount of pruning on the quantity m+n+1 as estimated from the position of the last non-zero coefficient in a transform block provides a loose upper bound on the number of rows (columns) in the transform block that may contain significant coefficient values. For example, in the case of FIG. 1, prior art techniques will assume that the first seven rows may contain non-zero coefficient values. In actuality, only the first four rows include significant coefficient values. For the larger transforms of HEVC, pruning techniques that may result in a tighter upper bound on the number of rows (columns) that may include non-zero coefficient values are desirable as even larger regions of such transform blocks may be zero.

In HEVC, as well as in H.264/AVC, the locations of non-zero transform coefficients in transform blocks are transmitted using significance maps. A significance map includes 1 bit flag for each coefficient location in a transform block. If the flag corresponding to a transform coefficient location is 1, the coefficient value is non-zero; otherwise, the value is zero. In HEVC, each individual flag in the significance map is referred to as a significant_coeff_flag. FIG. 2A shows the significance map for the example 16×16 transform block of FIG. 1. The significant coefficient flags with the value of 1 in the significance map indicate the non-zero coefficients A, B, C and X.

To reduce the number of significant coefficient flags that may be transmitted, HEVC uses a multilevel significance map coding scheme for transform blocks that includes a significance map and a group significance map. More specifically, to generate a group significance map for a transform block, the significance map of a transform block is logically divided into non-overlapping 4×4 blocks. Each entry in the group significance map is a significant coefficient group flag, referred to as a significant_coeff_group_flag, which represents one of these blocks. If the value of a significant coefficient group flag is 1, the corresponding 4×4 block of the significance map includes at least one non-zero significant coefficient flag, thus indicating that the corresponding transform block includes at least one non-zero transform coefficient in a corresponding 4×4 block; otherwise, the values of the significant coefficient flags in the corresponding block of the significance map are all zero. To signal the coefficient information, each significant coefficient group flag is signaled, followed by the sixteen significant coefficient flags of the corresponding 4×4 block, if the value of the significant coefficient group flag is 1. If the value of a significant coefficient group flag is 0, then all of the significant coefficient flag values in the corresponding 4×4 block are 0. In such a case, no significant coefficient flags are signaled, and the next significant coefficient group flag is signaled.

For example, FIG. 2A shows the 4×4 blocks of the significance map for the 16×16 transform block of FIG. 1 and FIG. 2B shows the group significance map for the significance map of FIG. 2A. Note that in this particular example, the only non-zero significant coefficient flags in the significance map of FIG. 2A are in the upper left 4×4 block. Thus, in the group significance map of FIG. 2B, only one significant coefficient group flag has a value of 1. To signal the coefficient information for this example, the value of the significant coefficient group flag in the top left corner of the group significance map is first signaled. Since the value of this flag is 1, the 16 significant coefficient flags of the corresponding 4×4 block in the top left corner of the significance map are signaled following the significant coefficient group flag. Since the rest of the significant coefficient group flags are 0, the values of each of those flags are subsequently signaled but no additional significant coefficient flags are signaled.

Embodiments of the invention provide for techniques for IDCT with pruning based on information available from group significance maps. More specifically, the group significance map of a transform block may be used to determine the number of rows (columns) of the transform block that may include non-zero coefficient values for IDCT pruning instead of using the position of the last non-zero coefficient as in the prior art. Using the group significance map may result in a tighter bound on the non-zero region of a transform block than that found using the position of the last non-zero coefficient. For example, analysis of the group significance map of FIG. 2B shows that only the first four rows of the transform block may include non-zero coefficient values as only the significant coefficient group flag at position (0,0) has a value of 1. In comparison, prior art techniques that use the signaled last significant coefficient position conclude that the first seven rows are non-zero. Assuming row-column order, fewer rows need to be transformed by the first 1D IDCT than in the prior art, which reduces computational complexity.

In some embodiments, optimized IDCT pruning for predetermined categories of rectangular distribution patterns of non-zero coefficients in transform blocks is provided. As is explained in more detail herein, the rectangular distribution pattern of non-zero coefficients in a transform block is determined from information in the corresponding group significance map and then used to determine if the distribution pattern fits into one of the predetermined distribution categories, an optimized 1D IDCT implementation for the distribution category is used for inverse transformation of the transform block.

Figure 3:
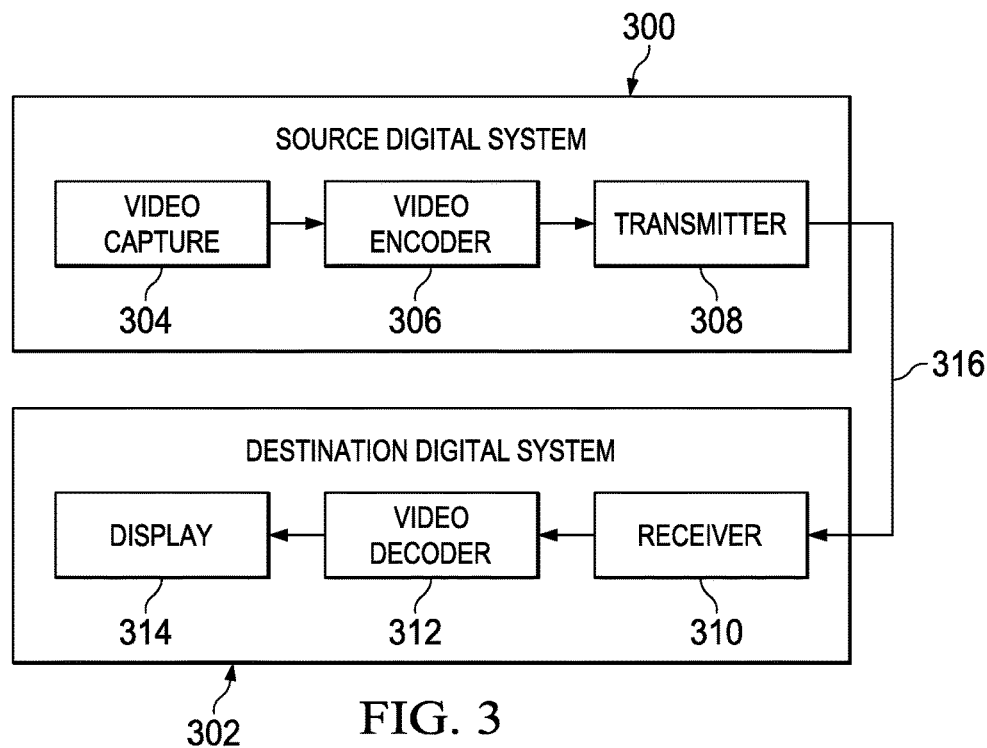
FIG. 3 is a block diagram of a digital system.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component 306. The video capture component 304 may be, for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of pictures, divides the pictures into largest coding units (LCUs), and encodes the video data in the LCUs. The video encoder component 306 may be configured to apply IDCT pruning techniques during the encoding process as described herein. An embodiment of the video encoder component 306 is described in more detail herein in reference to FIG. 4.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence. The video decoder component 312 may be configured to apply IDCT pruning techniques during the decoding process as described herein. An embodiment of the video decoder component 312 is described in more detail below in reference to FIG. 5.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video steaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 4:
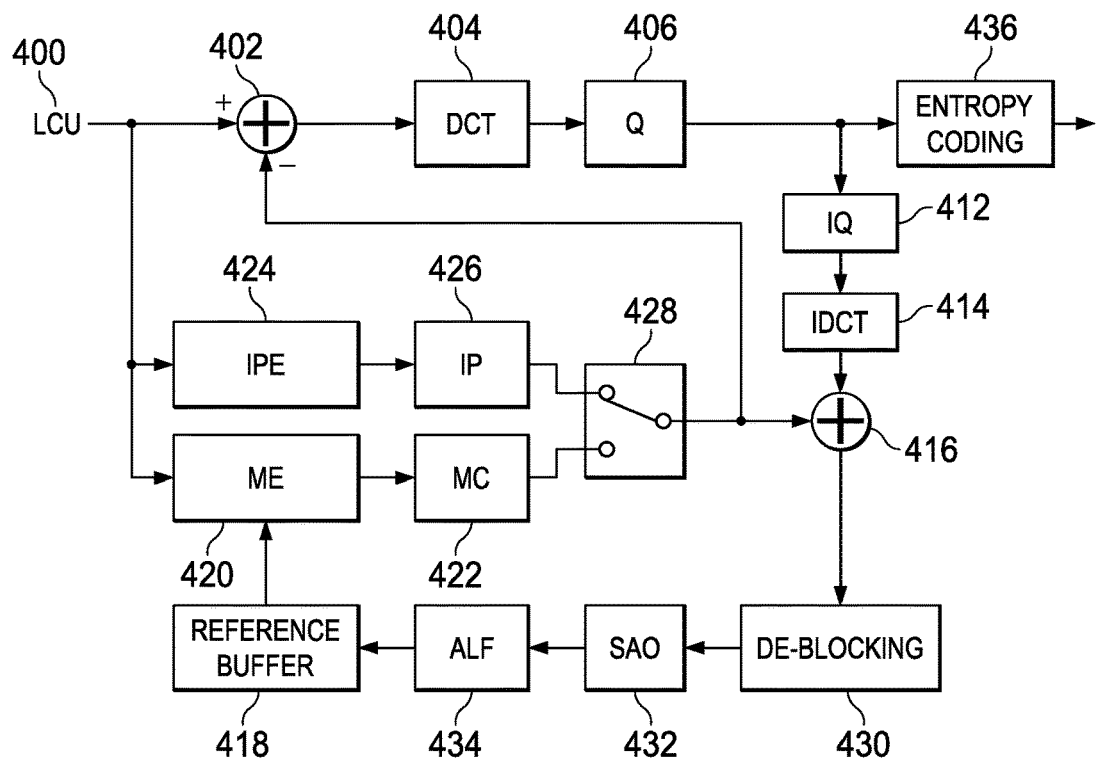
FIG. 4 is a block diagram of a video encoder.

FIG. 4 is a block diagram of the LCU processing portion of an example video encoder. The LCU processing receives LCUs 400 of the input video sequence from a coding control component (not shown) and encodes the LCUs 400 under the control of the coding control component to generate the compressed video stream. The LCUs 400 in each picture are processed in row order.

The coding control component sequences the various operations of the video encoder, i.e., the coding control component runs the main control loop for video encoding. For example, the coding control component 340 performs processing on the input video sequence that is to be done at the picture level, such as determining the coding type (I, P, or B) of a picture based on a high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCUs 400 from the coding control component are provided as one input of a motion estimation component (ME) 420, as one input of an intra-prediction estimation component (IPE) 424, and to a positive input of a combiner 402 (e.g., adder or subtractor or the like). Further, although not specifically shown, the prediction mode of each picture as selected by the coding control component is provided to a mode decision component 428 and an entropy coding component 436.

The storage component 418 provides reference data to the motion estimation component 420 and to the motion compensation component 422. The reference data may include one or more previously encoded and decoded pictures, i.e., reference pictures.

The motion estimation component 420 provides motion data information to the motion compensation component 422 and the entropy coding component 436. More specifically, the motion estimation component 420 performs tests on CUs in an LCU based on multiple inter-prediction modes (e.g., skip mode, merge mode, and normal or direct inter-prediction), PU sizes, and TU sizes using reference picture data from storage 418 to choose the best CU partitioning, PU/TU partitioning, inter-prediction modes, motion vectors, etc. based on coding cost, e.g., a rate distortion coding cost. To perform the tests, the motion estimation component 420 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 420 provides the motion vector (MV) or vectors and the prediction mode for each PU in the selected CU partitioning to the motion compensation component (MC) 422.

The motion compensation component 422 receives the selected inter-prediction mode and mode-related information from the motion estimation component 420 and generates the inter-predicted CUs. The inter-predicted CUs are provided to the mode decision component 428 along with the selected inter-prediction modes for the inter-predicted PUs and corresponding TU sizes for the selected CU/PU/TU partitioning. The coding costs of the inter-predicted CUs are also provided to the mode decision component 428.

The intra-prediction estimation component 424 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 424 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 424 provides the selected intra-prediction modes for the PUs, and the corresponding TU sizes for the selected CU partitioning to the intra-prediction component (IP) 426. The coding costs of the intra-predicted CUs are also provided to the intra-prediction component 426.

The intra-prediction component 426 (IP) receives intra-prediction information, e.g., the selected mode or modes for the PU(s), the PU size, etc., from the intra-prediction estimation component 424 and generates the intra-predicted CUs. The intra-predicted CUs are provided to the mode decision component 428 along with the selected intra-prediction modes for the intra-predicted PUs and corresponding TU sizes for the selected CU/PU/TU partitioning. The coding costs of the intra-predicted CUs are also provided to the mode decision component 428.

The mode decision component 428 selects between intra-prediction of a CU and inter-prediction of a CU based on the intra-prediction coding cost of the CU from the intra-prediction component 426, the inter-prediction coding cost of the CU from the motion compensation component 422, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 436.

The output of the mode decision component 428, i.e., the predicted PUs, is provided to a negative input of the combiner 402 and to the combiner 416. The associated transform unit size is also provided to the transform component (DCT) 404. The combiner 402 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 404 performs block transforms on the residual CUs to convert the residual pixel values to transform coefficients and provides the transform coefficients to a quantize component (Q) 406. More specifically, the transform component 404 receives the transform unit sizes for the residual CU and applies transforms of the specified sizes to the CU to generate transform coefficients. Further, the quantize component 406 quantizes the transform coefficients based on quantization parameters (QPs) and quantization matrices provided by the coding control component and the transform sizes and provides the quantized transform coefficients to the entropy coding component 436 for coding in the bit stream.

The entropy coding component 436 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, slice headers, flags indicating the CU/PU/TU partitioning of an LCU, significance maps and group significance maps for TUs, the prediction modes for the CUs, and the quantized transform coefficients for the CUs. The entropy coding component 436 also entropy encodes relevant data from the in-loop filters, such as the SAO parameters.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 412, which outputs a reconstructed version of the transform result from the transform component 404. The dequantized transform coefficients are provided to the inverse transform component (IDCT) 414, which outputs estimated residual information representing a reconstructed version of a residual CU. The inverse transform component 414 receives the transform unit size used to generate the transform coefficients and applies inverse transform(s) of the specified size to the transform coefficients to reconstruct the residual values. The inverse transform component 414 may perform a method for IDCT pruning using information from group significance maps as described herein. The reconstructed residual CU is provided to the combiner 416.

The combiner 416 adds the original predicted CU to the residual CU to generate a reconstructed CU, which becomes part of reconstructed picture data. The reconstructed picture data is stored in a buffer (not shown) for use by the intra-prediction estimation component 424.

Various in-loop filters may be applied to the reconstructed picture data to improve the quality of the reference picture data used for encoding/decoding of subsequent pictures. The in-loop filters may include a deblocking filter 430, a sample adaptive offset filter (SAO) 432, and an adaptive loop filter (ALF) 434. The in-loop filters 430, 432, 434 are applied to each reconstructed LCU in the picture and the final filtered reference picture data is provided to the storage component 418. In some embodiments, the ALF component 434 is not present.

Figure 5:
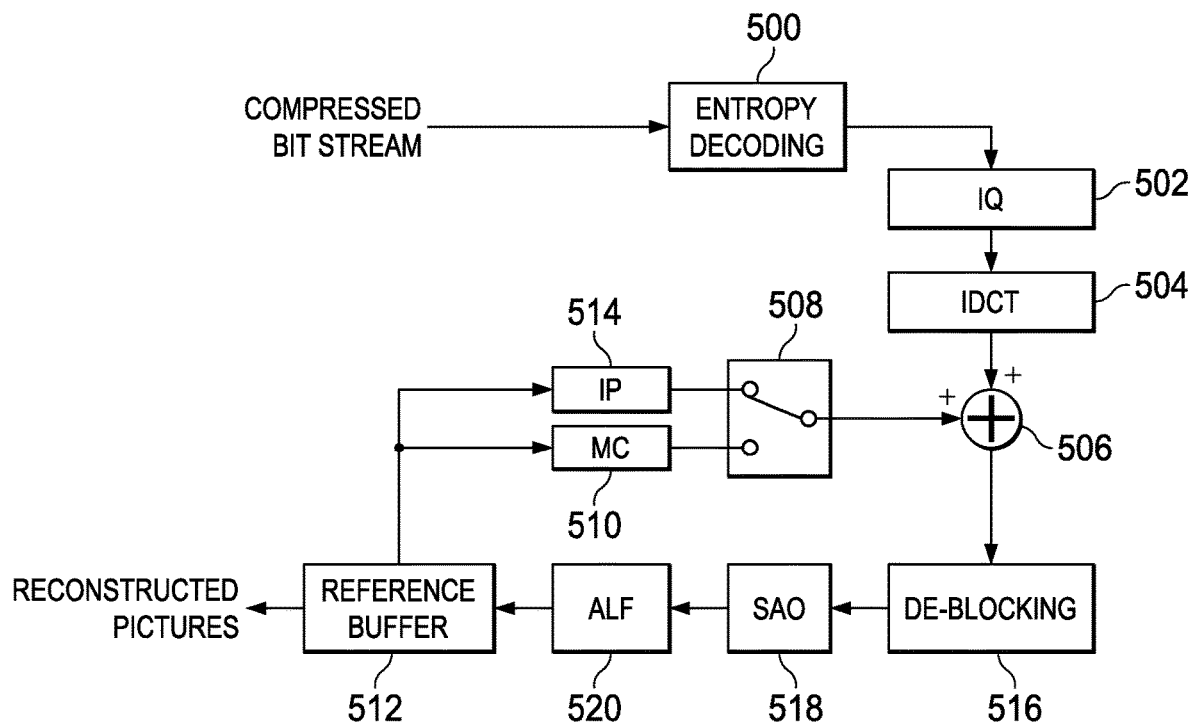
FIG. 5 is a block diagram of a video decoder.

FIG. 5 is a block diagram of an example video decoder. The video decoder operates to reverse the encoding operations, i.e., entropy coding, quantization, transformation, and prediction, performed by the video encoder of FIG. 4 to regenerate the pictures of the original video sequence. In view of the above description of a video encoder, one of ordinary skill in the art will understand the functionality of components of the video decoder without detailed explanation.

The entropy decoding component 500 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, prediction modes, significance maps and group significance maps for TUs, SAO parameters, etc. The decoded syntax elements are passed to the various components of the decoder as needed. For example, decoded prediction modes are provided to the intra-prediction component (IP) 514 or motion compensation component (MC) 510. If the decoded prediction mode is an inter-prediction mode, the entropy decoder 500 reconstructs the motion vector(s) as needed and provides the motion vector(s) to the motion compensation component 510.

The inverse quantize component (IQ) 502 de-quantizes the quantized transform coefficients of the CUs. The inverse transform component (IDCT) 504 transforms the frequency domain data from the inverse quantize component 502 back to the residual CUs. That is, the inverse transform component 504 applies an inverse unit transform, i.e., the inverse of the unit transform used for encoding, to the de-quantized residual coefficients to produce reconstructed residual values of the CUs. The inverse transform component 504 may perform a method for IDCT pruning using information from group significance maps as described herein to produce reconstructed residual values.

A residual CU supplies one input of the addition component 506. The other input of the addition component 506 comes from the mode switch 508. When an inter-prediction mode is signaled in the encoded video stream, the mode switch 508 selects predicted PUs from the motion compensation component 510 and when an intra-prediction mode is signaled, the mode switch selects predicted PUs from the intra-prediction component 514.

The motion compensation component (MC) 510 receives reference data from the storage component 512 and applies the motion compensation computed by the encoder and transmitted in the encoded video bit stream to the reference data to generate a predicted PU. That is, the motion compensation component 510 uses the motion vector(s) from the entropy decoder 500 and the reference data to generate a predicted PU.

The intra-prediction component (IP) 514 receives reconstructed samples from previously reconstructed PUs of a current picture from the storage component 512 and performs the intra-prediction computed by the encoder as signaled by an intra-prediction mode transmitted in the encoded video bit stream using the reconstructed samples as needed to generate a predicted PU.

The addition component 506 generates a reconstructed CU by adding the predicted PUs selected by the mode switch 508 and the residual CU. The output of the addition component 506, i.e., the reconstructed CUs, is stored in the storage component 512 for use by the intra-prediction component 514.

In-loop filters may be applied to reconstructed picture data to improve the quality of the decoded pictures and the quality of the reference picture data used for decoding of subsequent pictures. The applied in-loop filters are the same as those of the encoder, i.e., a deblocking filter 516, a sample adaptive offset filter (SAO) 518, and an adaptive loop filter (ALF) 520. The in-loop filters may be applied on an LCU-by-LCU basis and the final filtered reference picture data is provided to the storage component 512. In some embodiments, the ALF component 520 is not present.

Figure 6:
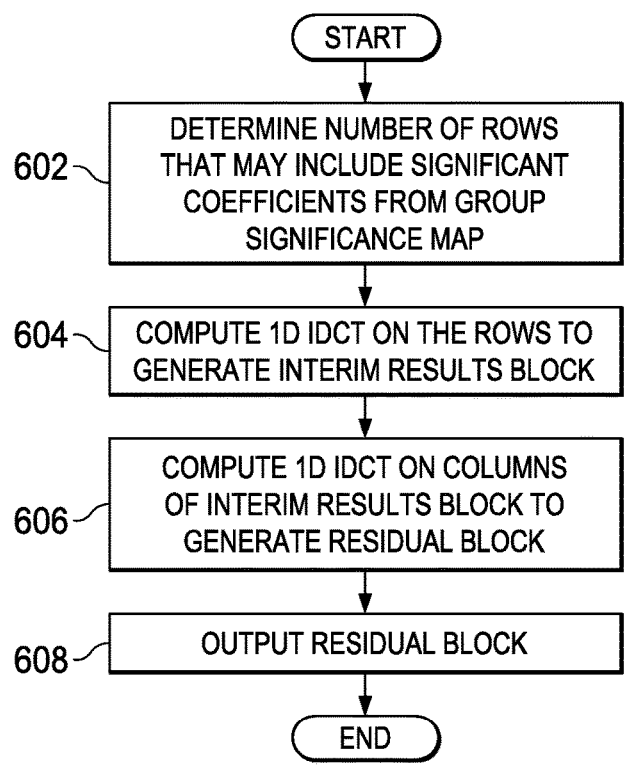
FIGS. 6 and 8 are flow diagrams of methods for IDCT pruning.
Figure 8:
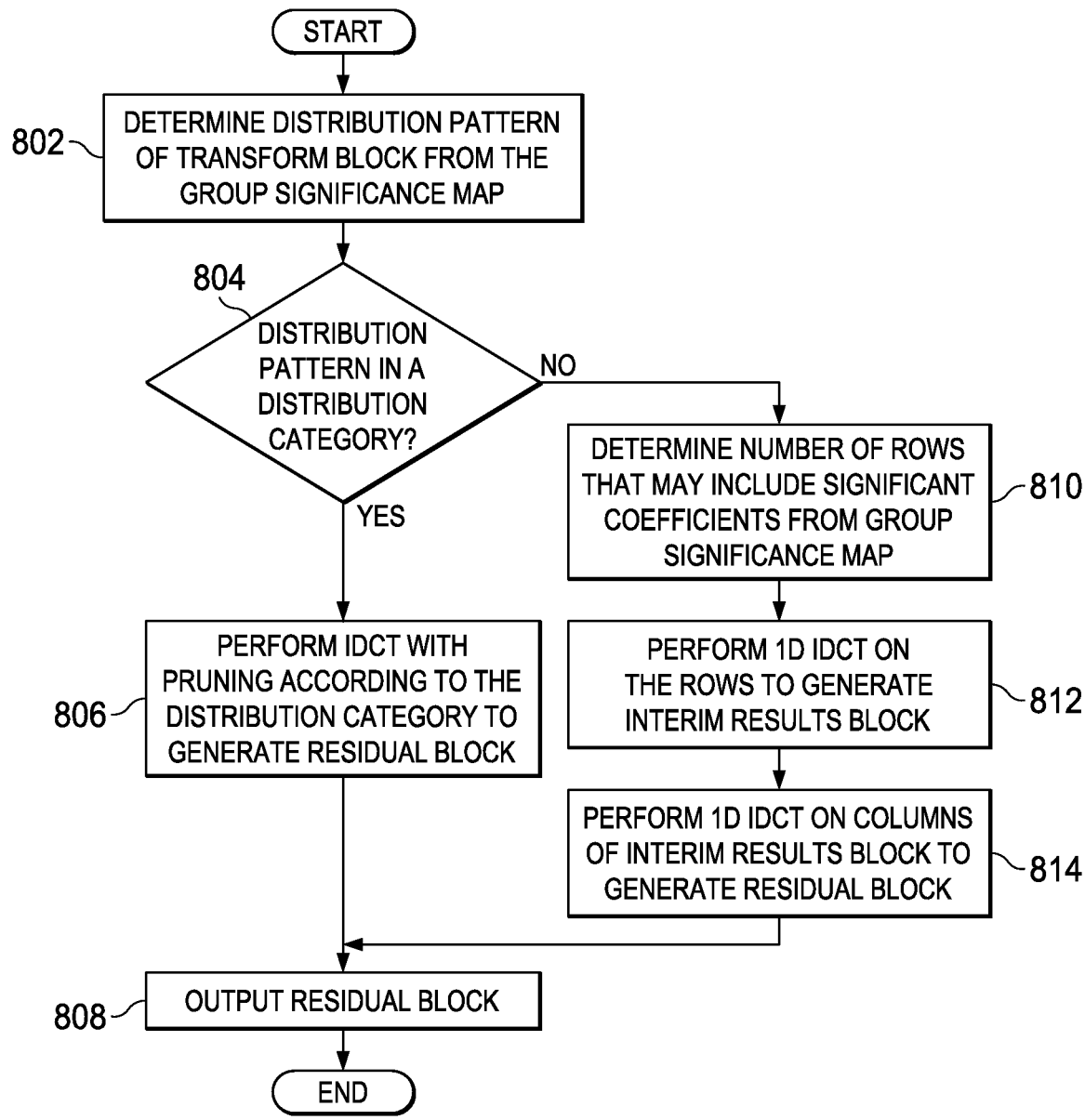

FIGS. 6 and 8 are flow diagrams of methods for IDCT pruning using information from a group significance map corresponding to a TU (transform block). Embodiments may be performed as part of IDCT computation in both a decoder and an encoder. If the methods are performed in a decoder, the group significance map corresponding to the transform block is first decoded from the compressed bit stream. For simplicity of explanation, embodiments are described assuming row-column order for application of the 1D IDCTs, i.e., that a 1D IDCT is first applied in the horizontal direction to the transform block, and then a 1D IDCT is applied in the vertical direction to the interim results block. One of ordinary skill in the art will understand other embodiments in which column-row order is used for application of the 1D IDCTs, i.e., that a 1D IDCT is first applied in the vertical direction to the transform block, and then a 1D IDCT is applied in the horizontal direction to the interim results block, without need for additional explanation.

Referring first to the method of FIG. 6, initially an upper bound on the number of rows of the transform block that may include significant (non-zero) coefficients is determined 602 from the group significance map. Assuming that the group significance map has N rows and M columns, the number of rows that may include significant coefficients may be determined, for example, by starting with the significant coefficient group flag at position (N,M) (the bottom right position) of the map and scanning backward in reverse raster scan order until a flag with a value of 1 is found. Note that this first non-zero significant coefficient group flag corresponds to a 4×4 block of the transform block containing the last non-zero coefficient value in the transform block. Assuming that the first row of the group significance map is row 0 and coordinates of the first non-zero flag are (x,y), the upper bound on the number of rows of the transform block that may include significant coefficients may be computed as $4(x+1)$.

A 1D IDCT is then computed 604 on the first $4(x+1)$ rows of the transform block to generate the first $4(x+1)$ rows of the interim results block. The remaining rows in the interim results block are assumed to be 0. Subsequently, a 1D IDCT is computed 606 on all columns of the interim results block to generate the residual block, and the residual block is output 608 for further processing.

Figure 7:
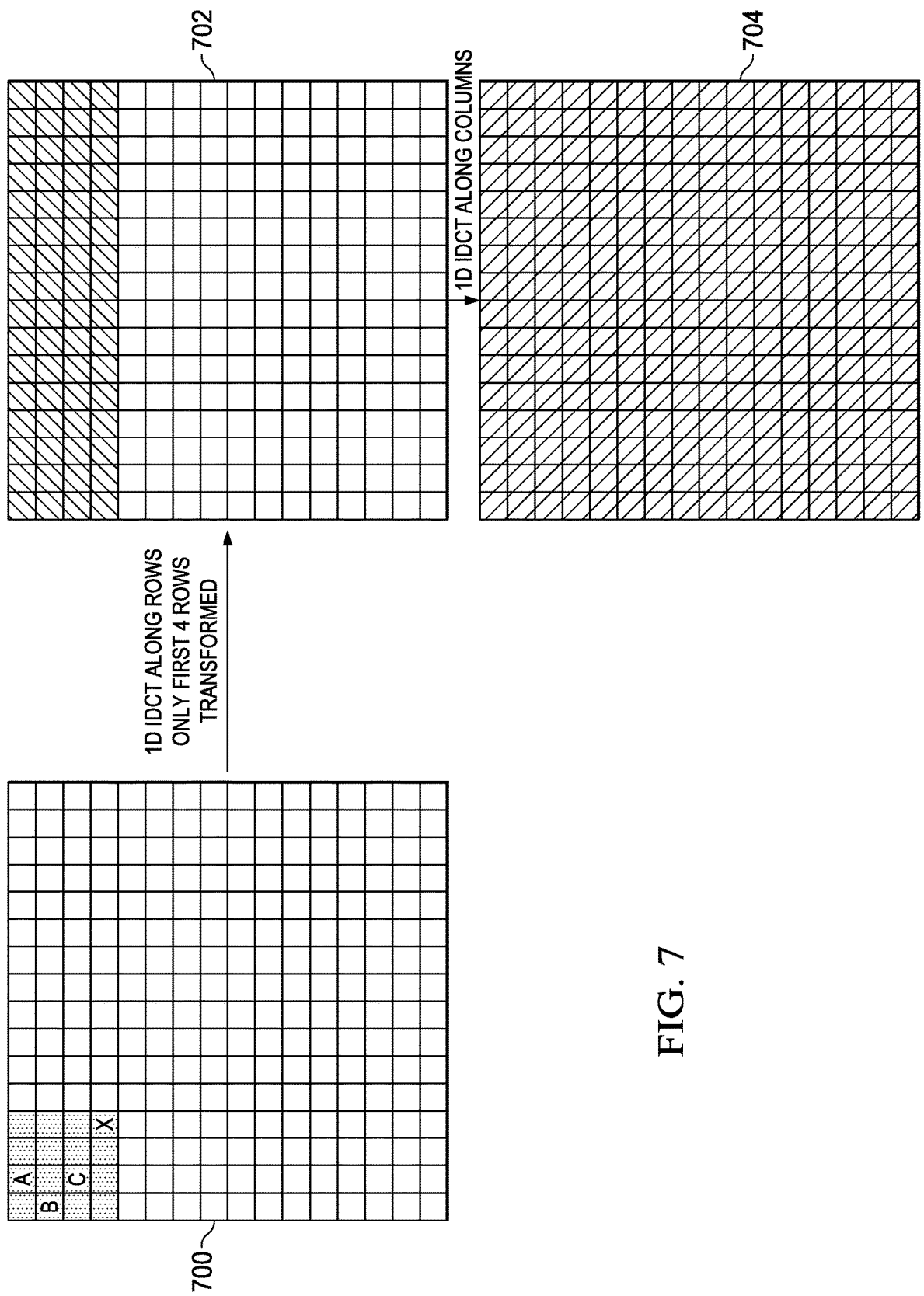

FIG. 7 shows an example of the IDCT pruning of the method of FIG. 6. The non-shaded regions of each block indicate the region of the block containing only zero coefficients. In this example, the input transform block 700 is the 16×16 transform block 100 of FIG. 1. The significance map and the group significance map for this transform block are shown in FIGS. 2A and 2B. The only significant coefficient group flag with a value of 1 in the group significance map is at position (0,0) in the map. Thus, the number of rows on which the initial 1D IDCT is to be computed is $4(0+1)=4$. The first four rows of the transform block 700 are transformed using the 1D IDCT to generate the first four rows of the interim results block 702 as only the first 4 rows of transform block 700 may have non-zero values. Then, all of the columns of the interim results block 702 are transformed using the 1D IDCT to generate the final inversely transformed output block 704, i.e., the residual block.

Figure 9:
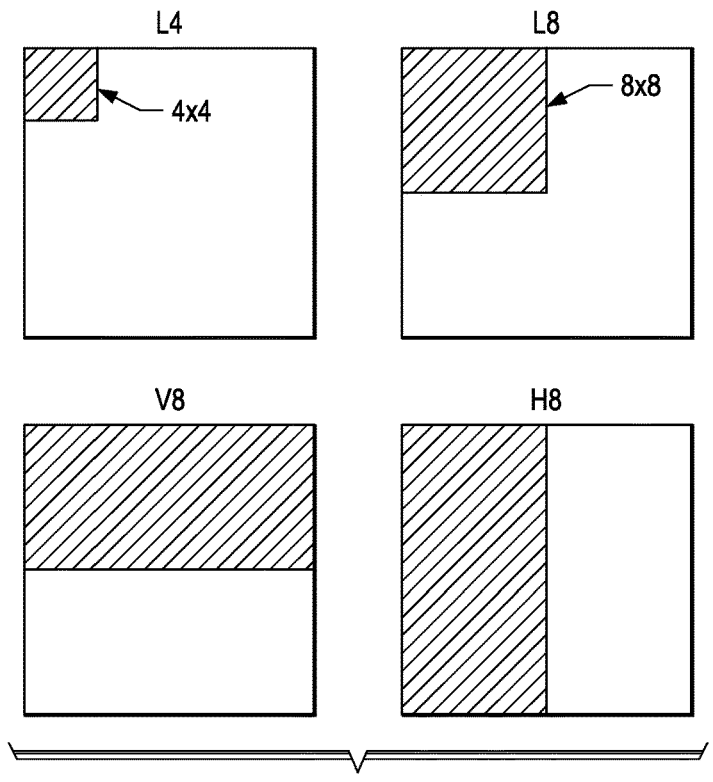
Figure 10:
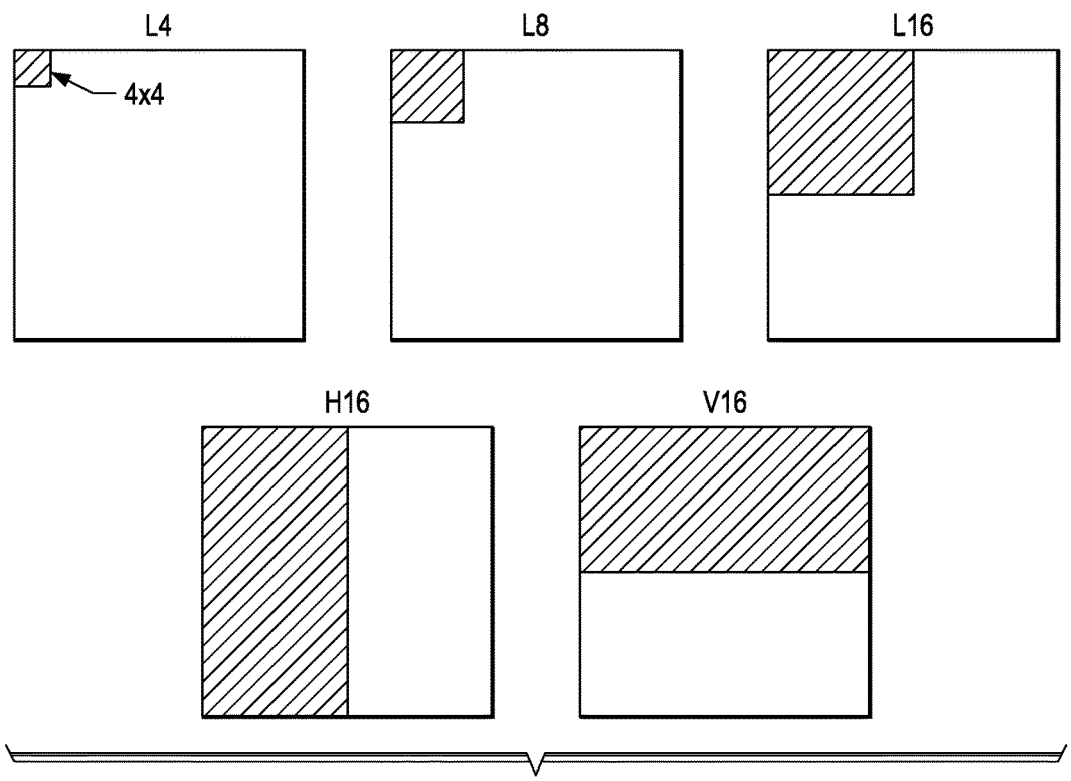

Referring now to the method of FIG. 8, the method provides optimized IDCT pruning for predetermined categories of rectangular distribution patterns of non-zero coefficients in transform blocks. As is explained in more detail below, the rectangular distribution pattern of non-zero coefficients in a transform block can be determined from information in the corresponding group significance map. The particular categories of rectangular distribution patterns with optimized IDCT pruning implementations provided in embodiments are a design decision. FIG. 9 shows some example distribution categories for a 16×16 transform block and FIG. 10 shows some example distribution categories for a 32×32 transform block. These example distribution categories are assumed during the description of the method. However, one of ordinary skill in the art will understand that embodiments are not limited to these particular distribution categories.

Referring again to FIG. 8, initially, the rectangular distribution pattern of non-zero coefficients in the transform block is determined 802 from the group significance map, and a determination 804 is made as to whether or not the distribution pattern fits in one of the predetermined distribution categories. The rectangular distribution of non-zero coefficients in a transform block is bounded by the rightmost column of the group significance map containing a non-zero significant coefficient group flag and the bottom-most row of the map containing a non-zero flag. The column number of the rightmost column and the row number of the bottom-most row of the distribution pattern are used to determine if the distribution pattern of the transform block fits into one of the predetermined distribution categories.

Assuming that the group significance map has N rows and M columns, the column number of the rightmost column and the row number of the bottom-most row may be found as follows. Beginning with column M and moving in descending column order, the flag values in each column of the group significance map are checked for a non-zero flag value. The first column found with a non-zero flag value indicates the rightmost boundary of the distribution pattern. This column may be referred to as column A. Beginning with row N and moving in descending row order, the flag values in each row of the group significance map are checked for a non-zero flag value. The first row with a non-zero flag value indicates the bottom-most boundary of the distribution pattern. This row may be referred to as row B.

The row number B and column number A may then be used to determine whether or not the distribution pattern fits within one of the predetermined distribution categories. For the example distribution categories of FIG. 9, the column and row numbers of a group significance map corresponding to the L4 category are A=B=1, the column and row numbers corresponding to the L8 category are A=B=2, the column and row numbers corresponding to the V8 category are A=4 and B=2, and column and row numbers corresponding to the H8 category are A=2 and B=4. For the example distribution categories of FIG. 10, the column and row numbers of a group significance map corresponding to the L4 category are A=B=1, the column and row numbers corresponding to the L8 category are A=B=2, the column and row numbers corresponding to the L16 category are A=B=4, the column and row numbers corresponding to the V16 category are A=8 and B=4, and column and row numbers corresponding to the H16 category are A=4 and B=8.

For example, consider the following group significance map for a 16×16 transform block:

1 1 0 0
1 1 0 0
0 0 0 0
0 0 0 0.

For this example, A=2 and B=2. Thus, the distribution pattern of the transform block fits in the L8 category of FIG. 9. In another example, consider the following group significance map for a 16×16 transform:

1 1 0 0
1 1 0 0
1 1 0 0
1 1 0 0.

For this example, A=2 and B=4. Thus, the distribution pattern of the transform block fits in the H8 category of FIG. 9.

Referring again to FIG. 8, if the distribution pattern of the transform block fits in one of the distribution categories 804, then an optimized IDCT with pruning specific to the particular distribution category is performed 806 on the transform block to generate the residual block and the residual block is output 808 for further processing. As can be seen from the example distribution categories of FIGS. 9 and 10, for a given distribution category, it is known that certain rows and/or columns of a transform block with the corresponding distribution pattern contain only zero-value coefficients. This a priori knowledge may be used to provide an optimized 1D IDCT with pruning tailored for the particular combination of all zero rows and/or columns of a distribution category.

For example, the unpruned 1D 16-pt IDCT for a 16×16 transform block would be computed as per the formula of FIG. 11 where X0-X15 are the inputs and the Ci are IDCT coefficients. If the distribution category is L4 of FIG. 9, then it is known that for any transform block having this distribution pattern, all coefficient values in the transform block except those in the 4×4 block are zero. Thus, the multiplications of the 1D IDCT for any coefficient values outside of this block may be pruned. An optimized implementation for this L4 distribution category as per the formula of FIG. 12 may be used in which the transform coefficient matrix includes only the first four columns of the original 16×16 transform matrix and the input vector includes only the first four coefficient values in a row of the transform block. This optimized implementation for the L4 distribution category may be denoted as an L4 1D IDCT. A similar optimized implementation for the L8 distribution category may be denoted as an L8 1D IDCT, etc. One of ordinary skill in the art will understand similar optimized implementations for the other example distribution categories of FIGS. 9 and 10. Note that for distribution categories such as L4 and L8 of FIG. 9 and L4, L8, and L16 of FIG. 10, the optimized Lx 1D IDCT may be used for both the rows of the transform block and the columns of the interim results block.

Other optimized 1D IDCT implementations may also be used, such as an optimized implementation built on even-odd decomposition of the relevant portion of the transform matrix and the non-zero portion of the input vector. For example, the unpruned 1D 16-pt IDCT for a 16×16 transform block using even-odd decomposition would be computed as per the formulas of FIG. 13. A optimized implementation for the L4 distribution category as per the formulas of FIG. 14 may be used in which the even and odd transform coefficient matrices include only the even and odd columns of the first four columns of the original 16×16 transform matrix and the even and odd input vectors include only the even and odd inputs from the first four coefficient values in a row of the transform block. FIG. 13 shows an even-odd decomposition for distribution category L4 of FIG. 9. This optimized implementation for the L4 distribution category may be denoted as an L4 1D IDCT. A similar optimized implementation for the L8 distribution category may be denoted as an L8 1D IDCT, etc. One of ordinary skill in the art will understand similar optimized implementations for the other example distribution categories of FIGS. 9 and 10.

Referring again to FIG. 8, if the distribution pattern of the transform block does not fit in one of the distribution categories 804, then the transform block is inverse transformed with an alternative pruning technique. First, an upper bound on the number of rows of the transform block that may include significant (non-zero) coefficients is determined 810 from the group significance map. Assuming that the group significance map has N rows and M columns, the number of rows that may include at least one significant coefficient may be determined, for example, by starting with the significant coefficient group flag at position (N,M) (the bottom right position) of the map and scanning backward in reverse raster scan order until a flag with a value of 1 is found. Note that this first non-zero significant coefficient group flag corresponds to a 4×4 block of the transform block containing the last non-zero coefficient value in the transform block. Assuming that the first row of the group significance map is row 0 and coordinates of the first non-zero flag are (x,y), the upper bound on the number of rows of the transform block that may include significant coefficients may be computed as 4(x+1).

A 1D IDCT is then computed 812 on the first 4(x+1) rows of the transform block to generate the first 4(x+1) rows of the interim results block. The remaining rows in the interim results block are assumed to be 0. Subsequently, a 1D IDCT is computed 814 on all columns of the interim results block to generate the residual block, and the residual block is output 808 for further processing.

Figure 15:
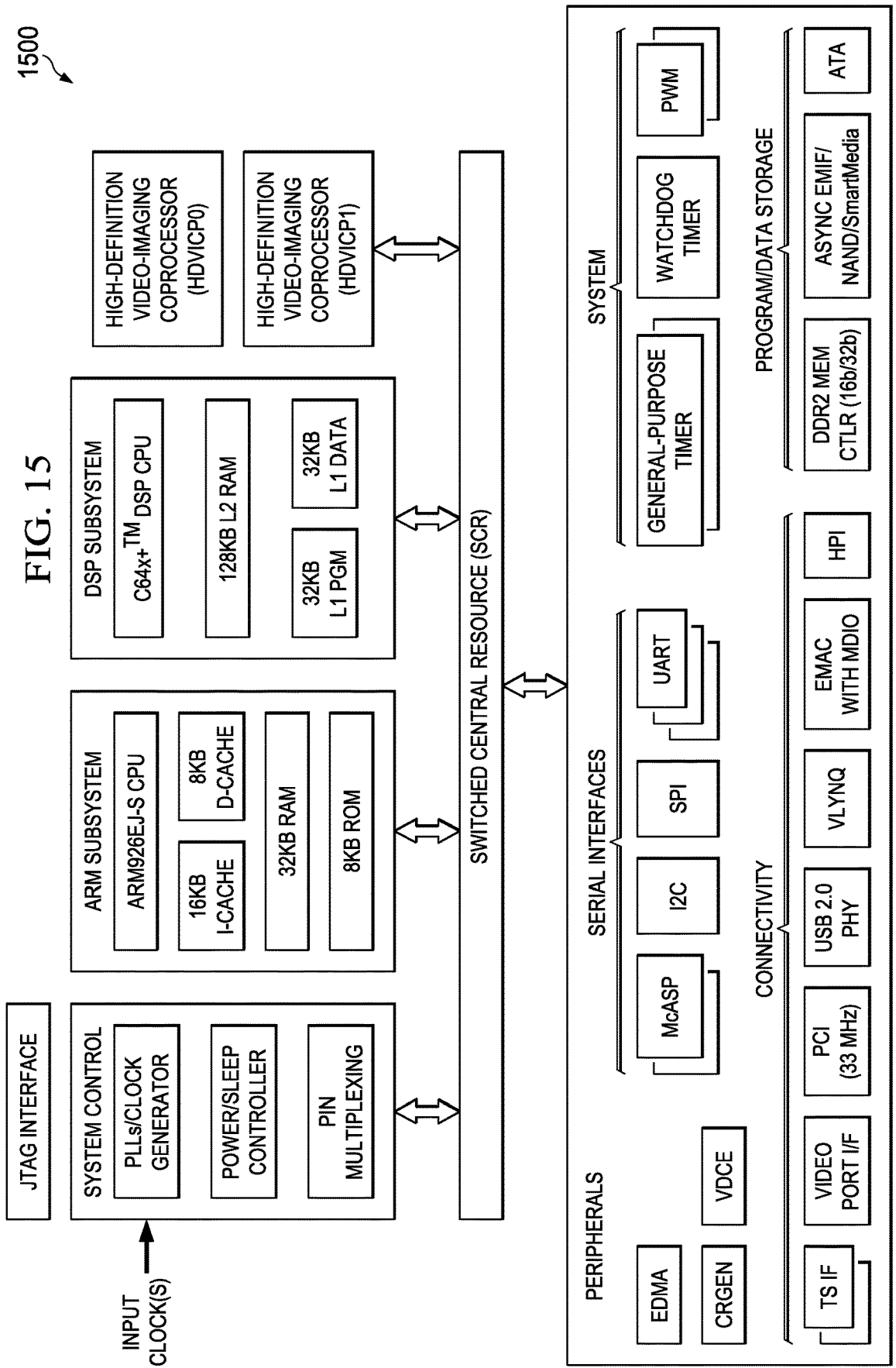
FIG. 15 is a block diagram of an illustrative digital system.

FIG. 15 is a block diagram of an example digital system suitable for use as an embedded system that may be configured to perform IDCT pruning as described herein during encoding of a video stream and/or during decoding of an encoded (compressed) video bit stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1500 is a programmable platform designed to meet the processing needs of applications such as video encode/decode/transcode/transrate, video surveillance, video conferencing, set-top box, medical imaging, media server, gaming, digital signage, etc. The SoC 1500 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1500 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 1500, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1500 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 15, the SoC 1500 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 1500 may be configured to perform IDCT pruning as described herein during encoding of a video stream and/or during decoding of an encoded (compressed) video bit stream. For example, the coding control of the video encoder of FIG. 4 may be executed on the DSP subsystem or the ARM subsystem and at least some of the computational operations of the block processing, including the intra-prediction and inter-prediction of mode selection, transformation, quantization, entropy encoding, inverse quantization, and inverse transformation (IDCT) may be executed on the HDVICP coprocessors. Similarly, at least some of the computational operations of the various components of the video decoder of FIG. 5, including entropy decoding, inverse quantization, inverse transformation (IDCT), intra-prediction, and motion compensation may be executed on the HDVICP coprocessors.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

For example, embodiments and examples have been described herein assuming a square transform block. Transform blocks may also be rectangular, e.g., 8×16, 16×8, 16×32, 32×16, etc. One of ordinary skill in the art will understand embodiments that include rectangular transform blocks without need of further description.

In another example, embodiments have been described herein assuming that a significant coefficient group flag in a group significance map corresponds to a 4×4 sub-block of a significant coefficient map, and thus to a 4×4 sub-block of a transform block. One of ordinary skill in the art will understand embodiments in which other sub-block sizes are used.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method comprising:
  receiving, by a video coder, a bit stream comprising a transform block and a group significant map, the transform block comprising transform coefficients and the group significant map comprising a significant coefficient group flag for the transform block;
  determining, by the video coder, a region of the transform block by scanning in reverse raster scan order using the significant coefficient group flag; and
  generating an interim results block, the interim results block is based on a one dimensional inverse discrete cosine transformation (IDCT) of the region of the transform block.

2. The method of claim 1, wherein the significant coefficient group flag is indicative of whether one of a plurality of blocks in a significance map includes at least one non-zero transform coefficient.

* * * * *